(12) United States Patent
Kumar

(10) Patent No.: US 11,561,867 B2
(45) Date of Patent: Jan. 24, 2023

(54) SYNCHRONIZING DATA COPY OPERATIONS FOR STORAGE SYSTEM WITH ACTIVE-ACTIVE STORAGE CONFIGURATION

(71) Applicant: EMC IP Holding Company LLC, Hopkinton, MA (US)

(72) Inventor: Sunil Kumar, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 11 days.

(21) Appl. No.: 17/145,658

(22) Filed: Jan. 11, 2021

(65) Prior Publication Data
US 2022/0222152 A1    Jul. 14, 2022

(51) Int. Cl.
*G06F 3/06* (2006.01)
*G06F 11/14* (2006.01)

(52) U.S. Cl.
CPC .......... *G06F 11/1469* (2013.01); *G06F 3/067* (2013.01); *G06F 3/0619* (2013.01); *G06F 3/0659* (2013.01); *G06F 3/0689* (2013.01); *G06F 11/1451* (2013.01); *G06F 11/1461* (2013.01)

(58) Field of Classification Search
None
See application file for complete search history.

(56) References Cited

U.S. PATENT DOCUMENTS

| | | | |
|---|---|---|---|
| 7,930,359 B2* | 4/2011 | Elrom | G06F 16/273 709/225 |
| 9,823,973 B1* | 11/2017 | Natanzon | G06F 3/067 |
| 10,365,978 B1* | 7/2019 | Whitney | G06F 11/1464 |
| 2003/0149763 A1* | 8/2003 | Heitman | G06F 3/0601 709/224 |
| 2017/0192682 A1* | 7/2017 | Atia | G06F 3/067 |
| 2017/0228181 A1* | 8/2017 | Chen | G06F 3/0665 |
| 2021/0034464 A1* | 2/2021 | Dailey | G06F 12/0868 |

OTHER PUBLICATIONS

Wikipedia, "Shadow Copy," https://en.wikipedia.org/w/index.php?title=Shadow_Copy&oldid=963779091, Jun. 21, 2020, 7 pages.
Microsoft Docs, "Volume Shadow Copy Service," https://docs.microsoft.com/en-us/windows-server/storage/file-server/volume-shadow-copy-service#how-volume-shadow-copy-service-works, Jan. 30, 2019, 23 pages.
Microsoft, "volume Shadow Copy Service," Accessed Oct. 16, 2020, 351 pages.
(Continued)

*Primary Examiner* — Kaushikkumar M Patel
(74) *Attorney, Agent, or Firm* — Ryan, Mason & Lewis, LLP

(57) ABSTRACT

Techniques disclosed herein provide techniques for coordinating host devices to synchronize data copy operations on storage arrays in an active-active storage configuration. For example, a method comprises managing generation of a backup copy of data in each of a set of storage arrays in an active-active storage configuration by causing one or more host devices that access the set of storage arrays to synchronously halt input-output operations associated with the set of storage arrays prior to causing the backup copy to be created in each of the set of storage arrays.

17 Claims, 5 Drawing Sheets

(56) References Cited

OTHER PUBLICATIONS

NVM Express, "NVM Express, Revision 1.3," NVM Express, May 1, 2017, 282 pages.
Vmware, Inc., "VMware vSphere Virtual Volumes," https://www.vmware.com/content/dam/digitalmarketing/vmware/en/pdf/solutionoverview/products/virtualvolumes/vmware_virtual_volumes_solutionsoverview.pdf, Sep. 2015, 2 pages.
Vmware, Inc., "VMware vSphere Virtual Volumes (vVols): Getting Started Guide," Hyperconverged Infrastructure Business Unit, Technical Documentation v 1.3, Sep. 2019, 40 pages.
Dell EMC, "Dell EMC SC Series Storage and Microsoft Multipath I/O," CML 1004, Jul. 2018, 36 pages.
U.S. Appl. No. 17/073,954 filed in the name of Sunil Kumar on Oct. 19, 2020, and entitled "Synchronized Generation of Backup Copy for Federated Application in an Information Processing."
U.S. Appl. No. 17/103,184 filed in the name of Sunil Kumar on Nov. 24, 2020, and entitled "Data Protection Management of Application Instance Executing in Accordance with Virtual Volume-Based Storage System."

\* cited by examiner

SYNCHRONIZING DATA COPY OPERATIONS FOR STORAGE SYSTEM WITH ACTIVE-ACTIVE STORAGE CONFIGURATION

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations for delivery over paths from the host devices to storage ports of the storage system. The storage ports are typically limited in number and each has limited resources for handling IO operations received from the host devices. Different ones of the host devices can run different applications with varying workloads and associated IO patterns. The storage systems can have multiple storage arrays configured in an active-active storage configuration, e.g., data stored in one of the storage arrays can be replicated to another one of the storage arrays utilizing a synchronous replication process. One illustrative reason for an active-active storage configuration is to provide data services with continuous availability to applications which demand high resiliency and cannot afford downtime.

When it comes to protecting data on, for example, a storage system with two storage arrays in an active-active storage configuration, an administrator can choose to create a point-in-time copy (snapshot) on one or the other storage array of the storage system or can create a snapshot separately on each of the storage arrays. The latter choice, however, does not guarantee that both snapshots are the same since the two storage arrays could be in different states when each separate snapshot is taken. In the case of data corruption, when the administrator chooses to restore the data from a snapshot, restore is typically performed from the snapshot of one storage array of the active-active storage configuration and when the snapshot restore completes, the data for the other storage array of the active-active storage configuration is rebuilt from the storage array where restore is performed. This is often called a mirror rebuild and is very time and resource consuming. Currently, even if a snapshot is taken on both storage arrays of the active-active storage configuration, as mentioned above, restore needs to be performed on only one storage array and a mirror rebuild needs to be performed on the other storage array.

SUMMARY

Illustrative embodiments coordinate host devices to synchronize data copy operations on storage arrays in an active-active storage configuration.

For example, in an illustrative embodiment, a method comprises managing generation of a backup copy of data in each of a set of storage arrays in an active-active storage configuration by causing one or more host devices that access the set of storage arrays to synchronously halt input-output operations associated with the set of storage arrays prior to causing the backup copy to be created in each of the set of storage arrays.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable fully consistent snapshots at multiple storage arrays of an active-active storage configuration simultaneously, i.e., multiple snapshots represent the same data. As such, a restore can be performed by each storage array from its corresponding snapshot and thus avoid a mirror rebuild.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
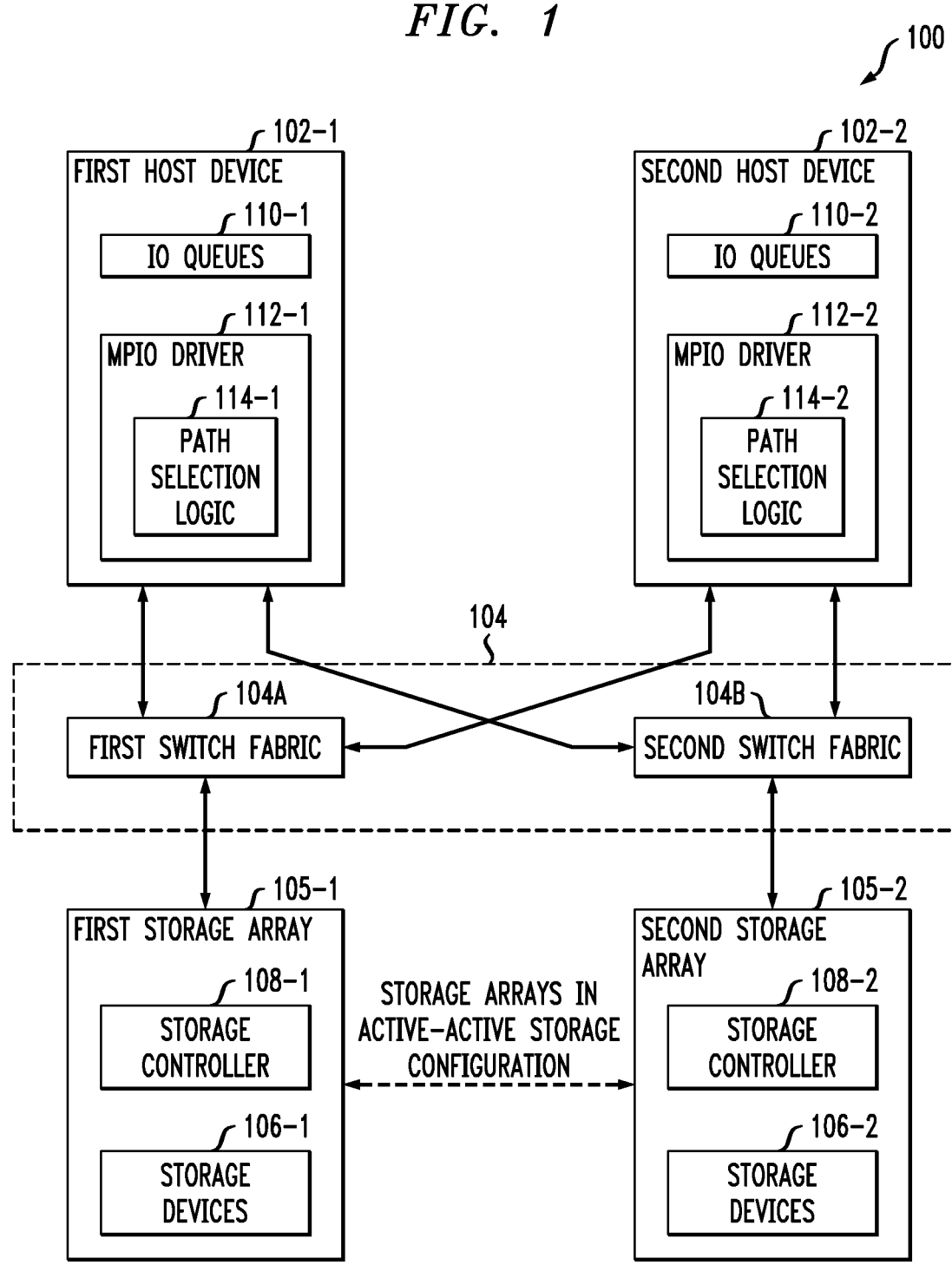
FIG. 1 illustrates an information processing system configured to implement an active-active storage configuration with which synchronized snapshot operations according to illustrative embodiments can be implemented.

FIG. 1 illustrates an information processing system 100 configured to implement an active-active storage configuration with which synchronized snapshot operations according to illustrative embodiments can be implemented. The information processing system 100 comprises at least first and second host devices 102-1 and 102-2, collectively referred to herein as host devices 102. The host devices 102 are coupled to a network 104 that comprises at least first and second switch fabrics 104A and 104B. The host devices 102 communicate over the network 104 via switch fabrics 104A and 104B with at least first and second storage arrays 105-1 and 105-2, collectively referred to herein as storage arrays 105. For example, the network 104 illustratively comprises at least one storage area network (SAN) and the fabrics 104A and 104B illustratively comprise respective distinct switch fabrics of a set of multiple switch fabrics interconnecting the host devices 102 with the storage arrays 105 over the one or more SANs. Each of the fabrics 104A and 104B in some embodiments is associated with a different SAN.

The system 100 is configured such that the first host device 102-1 communicates with the first storage array 105-1 over the first switch fabric 104A and communicates with the second storage array 105-2 over the second switch fabric 104B. Similarly, the second host device 102-2 communicates with the first storage array 105-1 over the first switch fabric 104A and communicates with the second storage array 105-2 over the second switch fabric 104B. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102, two switch fabrics 104A and 104B and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more Unity™ or PowerMax™ storage arrays, commercially available from Dell Technologies. As another example, one or both of the storage arrays 105 may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Small Computer System Interface (SCSI), Internet SCSI (iSCSI), Serial Attached SCSI (SAS) and Serial Advanced Technology Attachment (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 are illustratively arranged in an active-active storage configuration, although other storage configurations can be used in other embodiments. In an example of an active-active storage configuration that may be used, data stored in one of the storage arrays 105 is replicated to the other one of the storage arrays 105 utilizing a synchronous replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active storage configurations include "metro" or "stretched" high availability storage array configurations. The term "active-active storage configuration" as used herein is therefore intended to be broadly construed.

The storage arrays 105-1 and 105-2 are therefore assumed to be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. Thus, while one or more embodiments illustratively described herein apply to synchronous replication, the system may also be configured for asynchronous replication.

It is assumed that the storage controllers 108 of the respective storage arrays 105 each comprise replication control logic and a snapshot generator. The replication control logic illustratively controls performance of the above-noted synchronous replication process, or other replication processes in other embodiments. The snapshot generator is used to generate snapshots of one or more storage volumes that are subject to synchronous replication in conjunction with active-active storage clustering. Again, other types of storage configurations can be used in other embodiments.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for path selection modification. Other types of MPIO drivers from other driver vendors may be suitably modified to incorporate functionality for path selection modification as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

Other host device components can additionally or alternatively perform at least portions of controlling delivery of IO operations over selected paths, such as one or more host device processors or other control logic instances. Illustrative embodiments are therefore not limited to arrangements in which MPIO drivers perform such delivery control functions for IO operations. Moreover, terms such as "controlling delivery" of an IO operation as used herein are intended to be broadly construed so as to encompass, for example, selecting from a plurality of paths a particular path over which a particular IO operation is to be sent to one of the storage arrays 105, and sending the IO operation over that path.

In the FIG. 1 embodiment, the network 104 comprises first and second switch fabrics 104A and 104B through which the first and second host devices 102-1 and 102-2 are cross-connected to the first and second storage arrays 105-1 and 105-2 as shown. In a cross-connected arrangement of this type, supporting active-active storage configuration of the storage arrays 105 for the multiple host devices 102, use of conventional path selection in the MPIO drivers 112 of host devices 102 may be employed in illustrative embodiments.

The MPIO drivers 112 in some embodiments can include well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support path selection modification.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Recall that, as explained above in the background section, when it comes to protecting data on such an active-active storage configuration, an administrator can choose to create a point-in-time copy (snapshot) on one storage array (e.g., 105-1) or the other storage array (e.g., 105-1) of the storage system or can create a snapshot on both storage arrays. In the case of data corruption, when the administrator chooses to restore the data from the snapshot, restore is typically performed from the snapshot of one storage array of the active-active storage configuration and when the snapshot restore completes, the other storage array of the active-active storage configuration needs to rebuild the data from the storage array where restore is performed, i.e., a mirror rebuild which is very time and resource consuming. Using existing snapshot operations, even if a snapshot is taken on both storage arrays of the active-active storage configuration, in existing implementations, restore needs to be performed on only one storage array and a mirror rebuild needs to be performed on the other storage array since there is no guarantee that both snapshots are the same since the two storage arrays could be in different states when each separate snapshot is taken.

Illustrative embodiments provide for coordination of host devices 102-1 and 102-2 in order to provide synchronized snapshot operations in the active-active storage configuration formed by storage arrays 105-1 and 105-2. More particularly, in illustrative embodiments, techniques enable fully consistent snapshots at multiple storage arrays of an active-active storage configuration simultaneously, i.e., multiple snapshots represent the same data. As such, a restore can be performed by each storage array from its corresponding snapshot and thus avoid a mirror rebuild.

For example, one such implementation that can be adapted to provide synchronized snapshot operations in accordance with one or more illustrative embodiments is the Volume Shadow Copy Service (VSS) from Microsoft which is intended to assist in creating a consistent copy of an application running on a Microsoft Windows-based host server. However, the consistency offered by the existing VSS protocol is limited to a single server/operating system (OS).

In a VSS shadow copy operation, the snapshot creation occurs between freeze and thaw events. The freeze event serves to ensure that all write operations (by a host server) to the disk (storage array) are temporarily stopped (i.e., halted) and that files are in a well-defined state for backup. The thaw event serves to resume writes to the disk (i.e., release the halt or freeze) and clean up any temporary files or other temporary state information that were created in association with the shadow copy. The default window between the freeze and thaw events is relatively small (typically 60 seconds) so as to minimize interruption of any write operations. Further details of the VSS-enabled functionalities will be described below in the context of FIG. 2.

Figure 2:
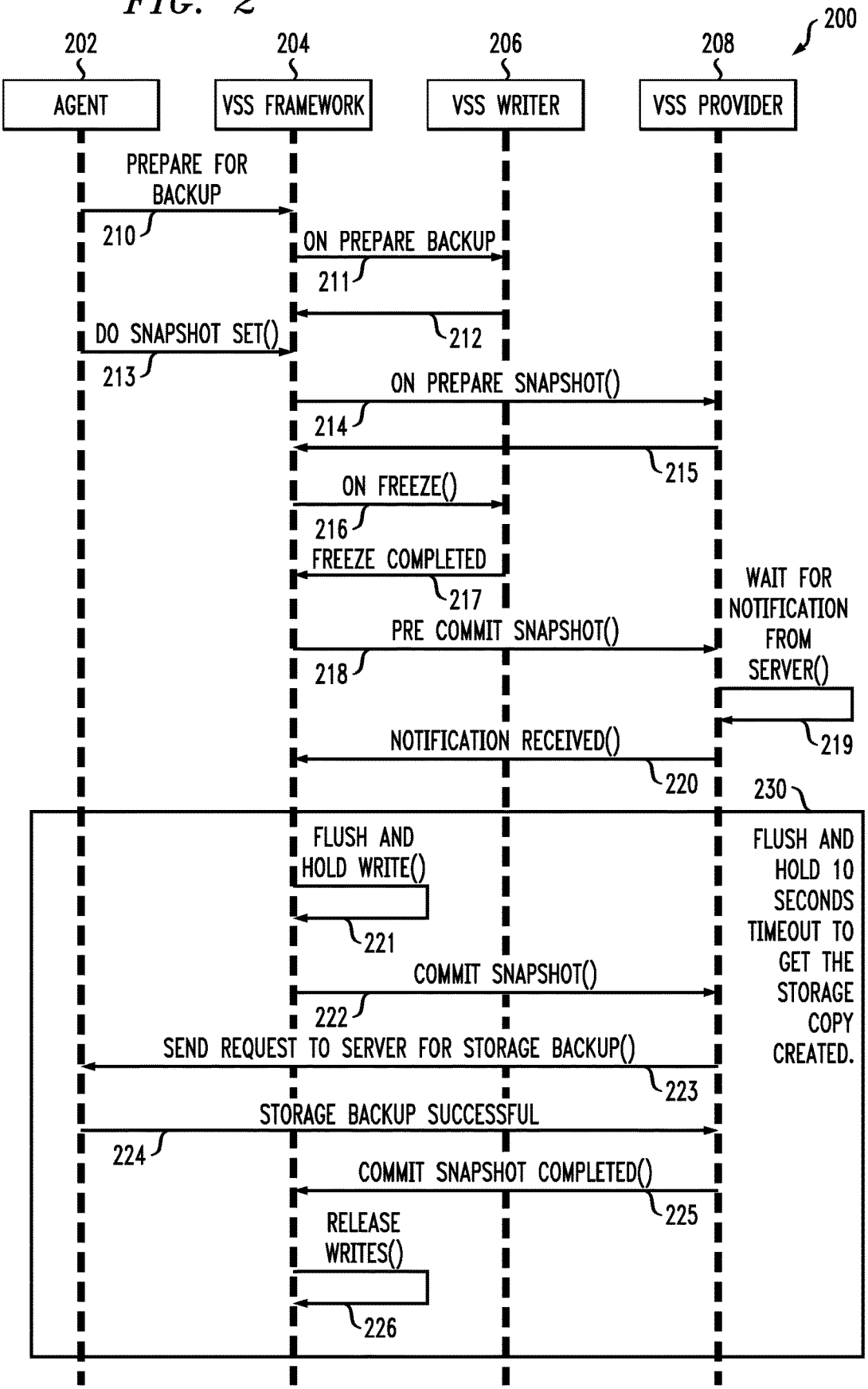
FIG. 2 illustrates an agent-based workflow of a process with which synchronized snapshot operations according to illustrative embodiments can be implemented.

More particularly, FIG. 2 depicts an agent-based workflow 200 of a VSS-enabled backup copy process. As shown for workflow 200, each host server (e.g., each host device 102 in FIG. 1) is assumed to comprise an agent module (Agent) 202, a framework (VSSFramework) 204, a writer (VSSWriter) 206, and a provider (VSSProvider) 208. In terms of the VSS protocol, the agent module 202 may be considered a VSS requestor (VSSRequestor). However, in alternative embodiments, other entities can serve as a requestor. It is to be appreciated that the labels in each step of workflow 200 represent one or more programmatic events, commands and/or instructions executed or otherwise issued within each host server based on a VSS-based methodology to effectuate the steps.

The VSS protocol coordinates snapshot copy-based backups and restore operations and includes functional components such as those depicted in FIG. 2. A requestor initiates backup and restore operations, and may also specify snapshot attributes for the backups that it initiates. A writer owns and manages the data to be captured in the snapshot. A provider creates and manages the snapshot, and can be either a hardware provider or a software provider.

In step 210, agent module 202 instructs framework 204 to prepare for the backup (PrepareForBackup).

In step 211, framework 204 then instructs writer 206 to prepare for the backup (OnPrepareBackup).

In step 212, writer 206 confirms to framework 204 receipt of the instruction.

In step 213, agent module 202 instructs framework 204 to initiate performance of the backup (DoSnapshotSet( )).

In step 214, framework 204 instructs provider 208 to prepare for the backup (OnPrepareSnapshot).

In step 215, provider 208 confirms to framework 204 receipt of the instruction.

In step 216, framework 204 initiates the freeze event (as explained above in the context of workflow 200) via writer 206 (OnFreeze( )). Recall that the freeze event serves to ensure that all write operations (by a host server) to the disk (storage array) are temporarily stopped and that files are in a well-defined state for backup.

In step 217, writer 206 indicates to framework 204 that the freeze event is completed (FreezeCompleted).

In step 218, framework 204 initiates the pre-commit snapshot state (as explained above in the context of workflow 200) via provider 208 (PreCommitSnapshot( )).

In step 219, provider 208 waits for notification from the storage array (WaitForNotificationFromServer( )).

In step 220, notification is sent from provider 208 to framework 204 (NotificationReceived( )).

Steps 221 through 226 are part of a flush and hold operation 230 (FlushAndHold) which corresponds to a timeout for the above-mentioned 10-second interval (i.e., also referred to herein as a commit window or, more generally, as a time period) to enable the backup copy to be created on the storage array.

Thus, in step 221, framework 204 initiates the flush and hold operation (FlushAndHoldWrite( )).

In step 222, framework 204 instructs provider 208 to create and commit the snapshot (CommitSnapshot( )).

In step 223, provider 208 sends a request to the storage array through agent module 202 to store the snapshot (SendRequestToServerForStorageBackup( )).

In step 224, the storage array acknowledges to provider 208 through agent module 202 that the snapshot storage was successful (StorageBackupSuccessful).

In step 225, provider 208 notifies framework 204 that the snapshot has been committed and thus the backup copy process is completed (CommitSnapshotCompleted( )).

In step 226, framework 204 releases the hold on IO operations (ReleaseWrites( )) and normal application component execution operations resume.

However, as mentioned above, the above workflow 200 in the existing VSS protocol is limited to a single server/operating system (OS).

To overcome this and other drawbacks related to existing VSS and other data copy operations, illustrative embodiments coordinate multiple host servers to generate synchronized backup copies (snapshots) at the storage arrays. Thus, in an illustrative embodiment, assume that host devices 102-1 and 102-2 in FIG. 1 are configured as VSS-enabled host servers, while storage arrays 105-1 and 105-2 are configured as VSS-responsive storage arrays. A set of orchestration steps is used along with a VSS framework to synchronize VSS commit windows across the host servers.

The execution of the set of orchestration steps advantageously results in execution of snapshot operations at the same time (simultaneously or contemporaneously similar times so long as the same data is captured in each backup copy) when inputs/outputs (IOs) are frozen by a Windows kernel (or whatever the operating system of the host server is) across all the involved operating system instances. As will be further described below in the context of FIG. 3, agent-based workflow 200 described above in FIG. 2 is adapted to coordinate host IO across all nodes accessing the active-active volumes and synchronizes the IO freeze operations before creating a snapshot on each of the storage arrays of the active-active storage configuration.

Figure 3:
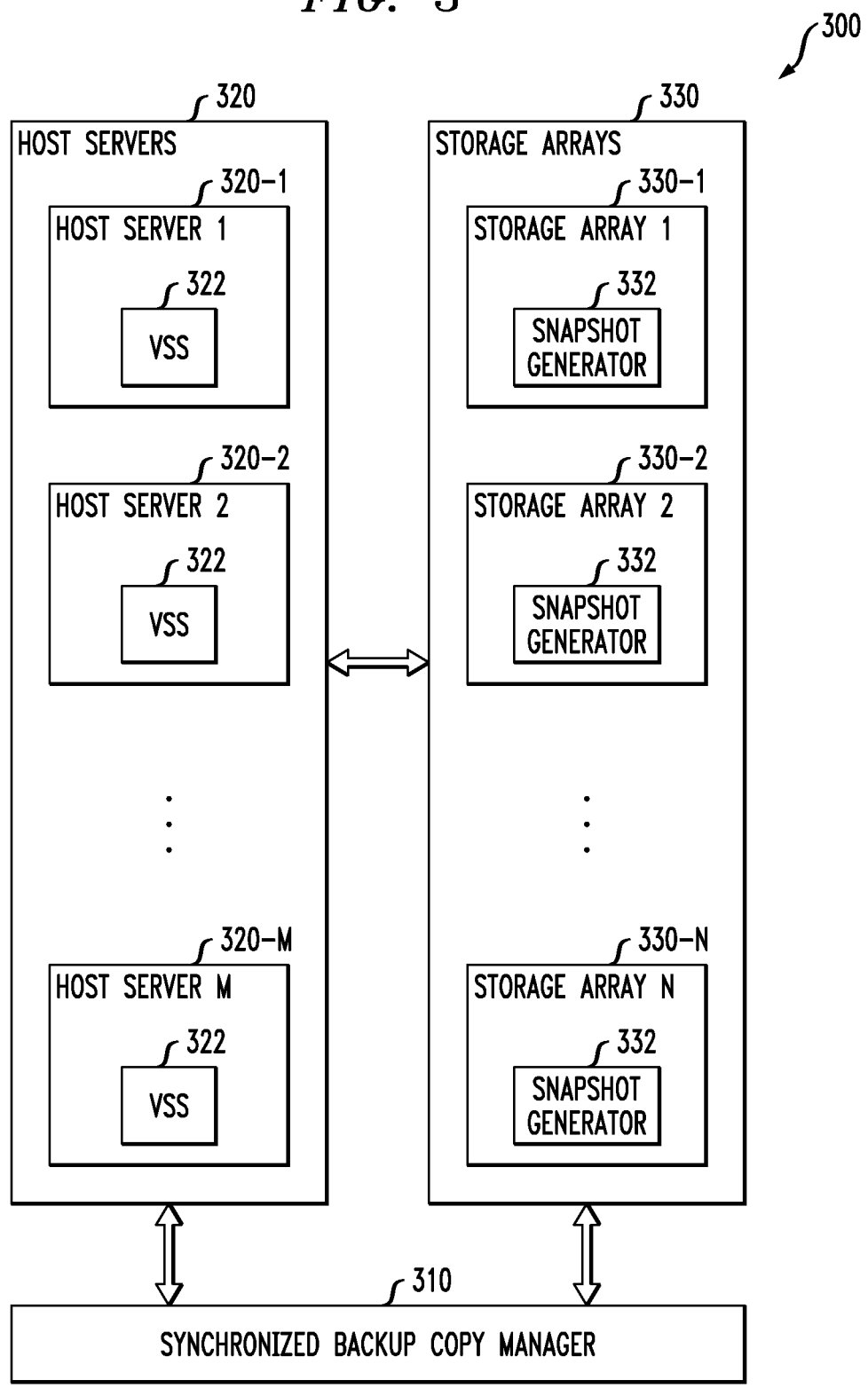
FIG. 3 illustrates an information processing system configured to implement an active-active storage configuration with synchronized snapshot operations according to an illustrative embodiment.

Turning now to FIG. 3, an information processing system 300 is depicted that is configured to implement an active-active storage configuration with synchronized snapshot operations according to an illustrative embodiment.

As shown, a synchronized backup copy manager 310 is operatively coupled to a set of host servers 320 comprising host server 320-1, 320-2, . . . , 320-M (collectively referred to herein as host servers 320 or individually as host server 320) and a set of storage arrays 330 comprising storage arrays 330-1, 330-2, . . . , 330-N (collectively referred to herein as storage arrays 330 or individually as storage array 330). It is to be appreciated that each host server 320 is an example of a host device 102 in FIG. 1 while each storage array 330 is an example of a storage array 105 in FIG. 1. Thus, any two of storage arrays 330 are part of an active-active storage configuration with one or more of host servers 320. In some embodiments, a given storage array 320 can serve as part of two separate active-active storage configurations. It is to be appreciated that more than two storage arrays 330 can be configured to provide synchronous replication along with synchronized snapshot functionalities for one or more host servers 320.

Furthermore, as shown, each host server 320 comprises VSS functionality 322 (VSS). It is to be appreciated that VSS functionality, in illustrative embodiments, means that each host server 320 comprises the VSS components described above in the context of workflow 200 of FIG. 2, i.e., an agent module (backup agent) which serves as a VSS requestor (VSSRequestor), a VSS framework (VSSFramework), a VSS writer (VSSWriter), and a VSS provider (VSSProvider). As will be explained below, some of the VSS components are provided to the host server 320 during synchronous snapshot operations.

Still further, as shown, each storage array 330 comprises a snapshot generator 332. As mentioned above, the snapshot generator can be implemented as part of a storage controller (e.g., 108 in FIG. 1) of a storage array and is configured to create the actual point-in-time copy (snapshot) of data stored in the storage array.

It is to be appreciated that while synchronized backup copy manager 310 is illustrated as being separate from host servers 320 and storage arrays 330, in alternative embodiments, it can be implemented in part or in whole in one or more of host servers 320 and/or one or more of storage arrays 330.

Illustrative detailed steps performed to create a fully consistent snapshot copy at two storage arrays 330 operating in an active-active storage configuration and to perform a restore will now be explained below in the context of FIG. 4 with reference back to components shown in FIGS. 2 and 3. As is evident, such synchronous snapshot functionality can be similarly implemented in information processing system 100 of FIG. 1.

Figure 4:
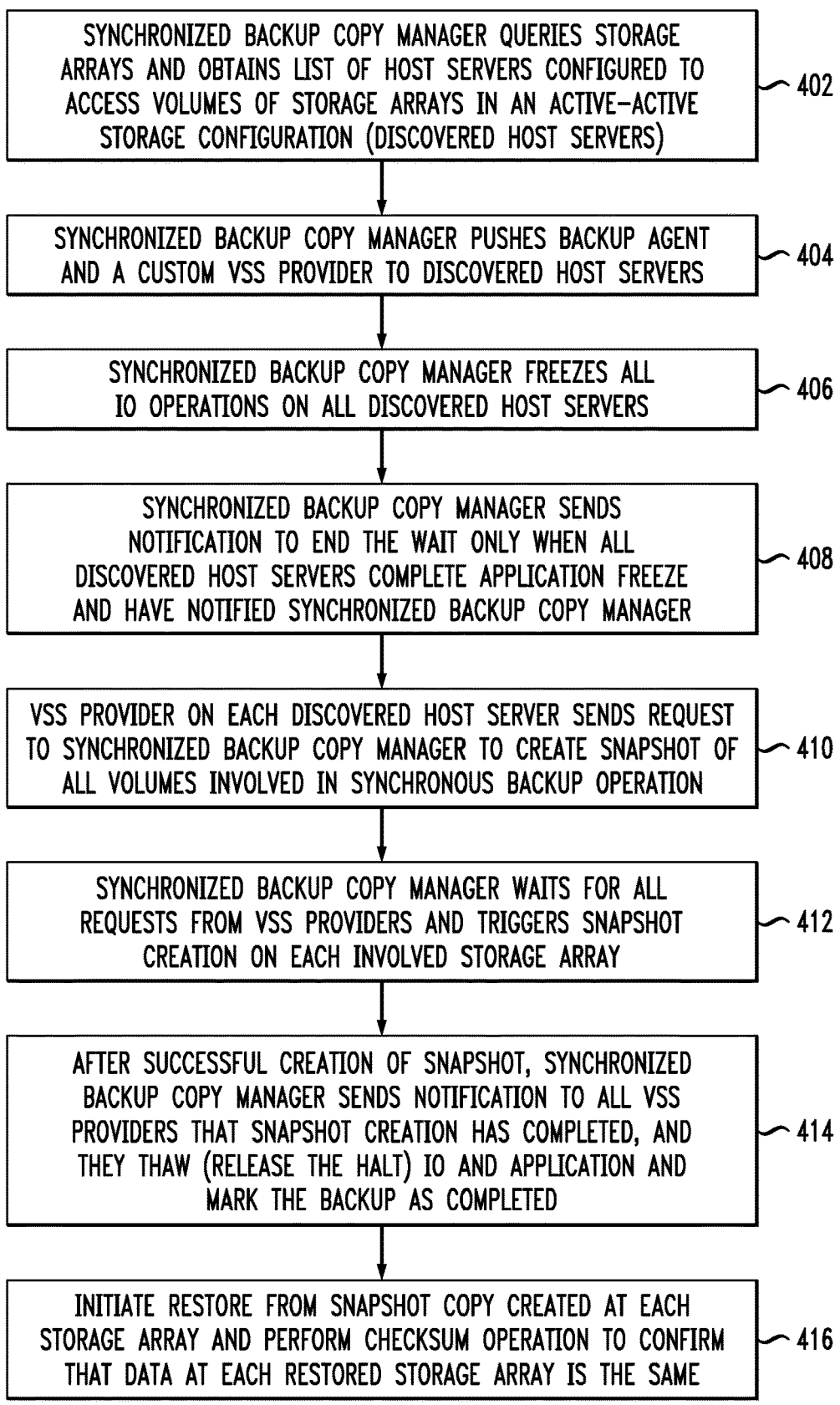
FIG. 4 illustrates a methodology for synchronized snapshot operations according to an illustrative embodiment.

Referring now to FIG. 4, a synchronized snapshot methodology 400 according to an illustrative embodiment is shown.

In step 402, synchronized backup copy manager 310 (e.g., executing a backup application such as, but not limited to, PowerProtect, AppSync, etc.) queries storage arrays 330 and obtains a list of the host servers 320 that are configured to access volumes of storage arrays 330 that are in an active-active storage configuration (such volumes being referred to as active-active volumes) and that can perform read/write IO on the active-active volumes. The list of host servers may be obtained by synchronized backup copy manager 310 from storage system management providers and/or directly from the storage controllers of each storage array 330. The host servers 320 in the list are referred to as discovered host servers 320.

In step 404, synchronized backup copy manager 310 pushes a backup agent 202 and a VSS provider 208 to the host servers 320 that are discovered in step 402. The VSS provider 208 referred to below may be considered as being custom, in illustrative embodiments, since it is adapted from the existing VSS protocol to interact with the synchronized backup copy manager 310. The pushed backup agent 202 and VSS provider 208 are considered part of VSS 322 in each host server 320.

In step 406, at the beginning of a snapshot operation, synchronized backup copy manager 310 asks the agents 202 on all of the discovered host servers 320 to freeze their executing application and corresponding IO (by calling DoSnapshotSet( ) call 213 in the VSS framework 204) and sends each agent notification once the freeze is completed. Since the backup agents are the VSS requestors, after a complete freeze of the application by the VSS writers 206 in each VSS 322, the VSS framework 204 triggers PreCommitSnapshot( ) 218 in the VSS provider 208. This sequence is performed on all of the discovered host servers 320.

In step 408, custom VSS provider 208 waits in the PreCommitSnapshots( ) state until it gets notification from the synchronized backup copy manager 310 to end the wait (freeze). Synchronized backup copy manager 310 sends notification to end the wait only when all discovered host servers complete the application freeze step and have notified synchronized backup copy manager 310. This is an important step in synchronizing all the discovered host servers 320, as the next step after PreCommitSnapshots( ) 218 is the CommitSnapshots( ) 222, where the operating system kernel (e.g., Windows kernel) of the host server 320 flushes all IO on the volumes involved in the backup and holds any further IO on the volumes. As mentioned above, this period is limited to a maximum of 10 seconds, and if exceeded, results in a copy creation failure (e.g., snapshot does not get created). Thus, to cause the VSS providers 208 in all discovered host servers 320 to enter CommitSnapshots( ) 222 at approximately the same time, it is important to synchronize all the agents in PreCommitSnapshot( ) 218.

In step 410, once the CommitSnapshots( ) 222 is invoked by VSS framework 204, the VSS provider 208 on each of the discovered host servers 320 sends a request to synchronized backup copy manager 310 to create a snapshot of all the volumes on storage arrays 330 involved in the synchronous snapshot operation.

In step 412, synchronized backup copy manager 310 waits for the requests from all the VSS providers 208 which it expects to get nearly simultaneously as all the providers were earlier synchronized in step 408 to execute the CommitSnapshots( ) 222 simultaneously. Once the request from all providers arrives at the synchronized backup copy manager 310, it consolidates the list of storage array volumes and triggers the snapshot operation by sending an instruction to each snapshot generator 332 in each involved storage array 330 to create the snapshot therein. Note that the snapshot operation is triggered at a time when all the volumes have their IO frozen and in case of active-active volumes, it means both sides of the volume (e.g., both storage arrays 330 in the active-active storage configuration) have the same data (byte by byte). Thus, creating a snapshot of both sides of the active-active storage configuration, results in a fully consistent snapshot on both sides which have exactly the same data.

In step 414, after successful creation of the snapshot, the synchronized backup copy manager 310 sends notification to all the VSS providers 208 that snapshot creation has completed, and they can thaw (release the halt) the IO and the application and mark the backup as completed.

In step 416, in case of data corruption, the administrator initiates a restore on each storage array from the snapshot copy taken for that storage array, and avoids a mirror rebuild. To be certain that the data in each copy is exactly the same, after completion of restore, synchronized backup copy manager 310 notifies the storage system that comprises the storage arrays to perform a basic checksum to validate that the data is the same on both storage arrays for the active-active storage configuration and then it marks the replication link as synchronized and restore completes.

The particular processing operations and other system functionality described in conjunction with FIG. 1-4 are presented by way of illustrative example only, and should not be construed as limiting the scope of the disclosure in any way. Alternative embodiments can use other types of processing operations involving host devices, storage systems and snapshot creation functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of synchronized snapshot arrangements within a given information processing system.

Functionality such as that described in conjunction with the workflow diagram of FIG. 2 and the methodology of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system described herein may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components described herein can be implemented for use by tenants of such a multi-tenant environment.

As mentioned previously, cloud infrastructure as disclosed herein can include cloud-based systems. Virtual machines provided in such systems can be used to implement illustrative embodiments. These and other cloud-based systems in illustrative embodiments can include object stores.

Illustrative embodiments of processing platforms will now be described in greater detail with reference to FIGS. 5 and 6.

Figure 5:
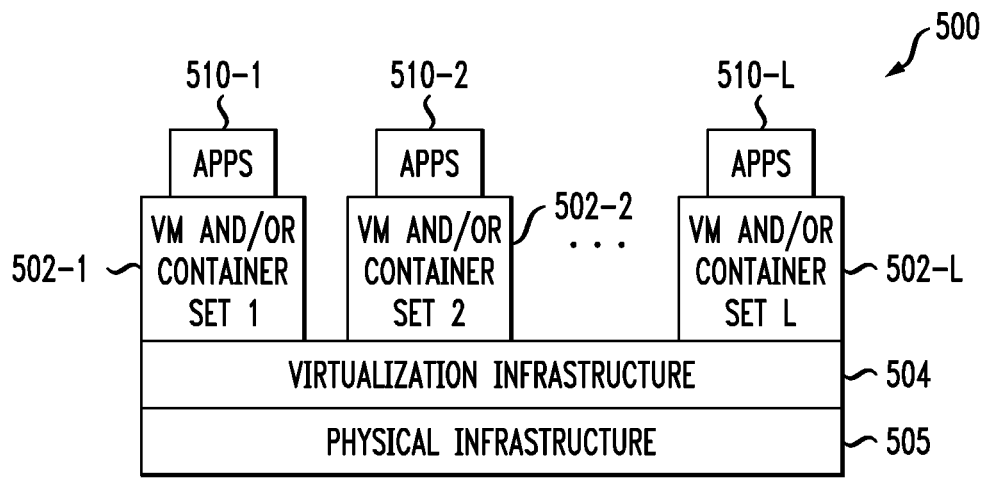
FIGS. 5 and 6 show examples of processing platforms that may be utilized to implement at least a portion of an information processing system with synchronized snapshot operations according to illustrative embodiments.
Figure 6:
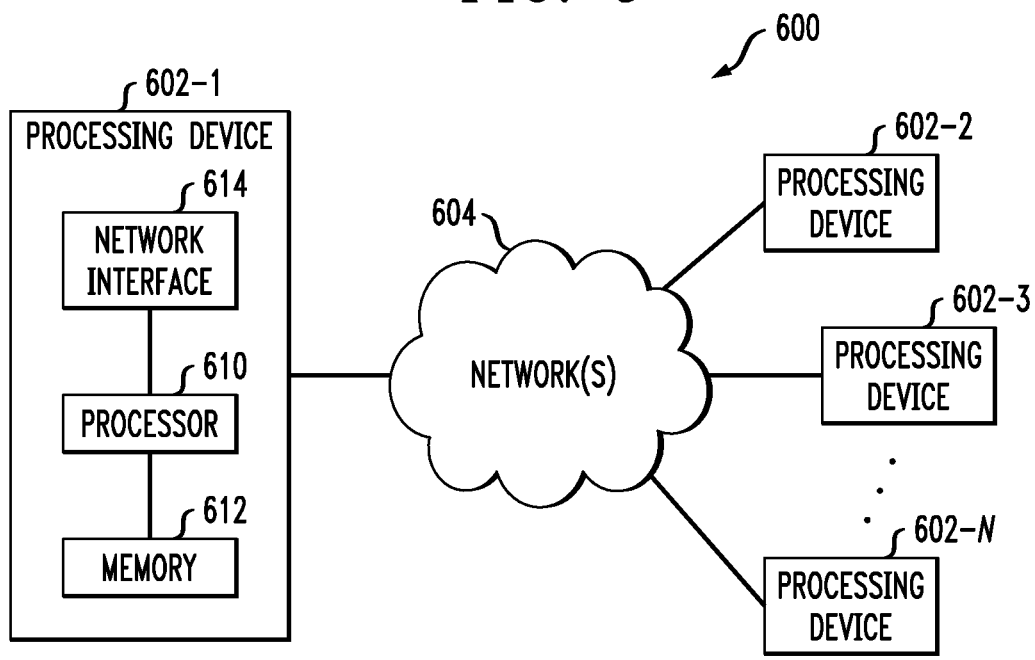

FIG. 5 shows an example processing platform comprising cloud infrastructure 500. The cloud infrastructure 500 comprises a combination of physical and virtual processing resources that may be utilized to implement at least a portion of the information processing systems described herein. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of systems 100 and 300 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 or 300 and includes a plurality of processing devices, denoted 602-1, 602-2, 602-3, . . . 602-N, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and systems 100 and 300 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the FIG. 1 system and the FIG. 3 system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory, the at least one processing device, when executing program code, is configured to:
manage generation of a backup copy of data in each of a set of storage arrays in an active-active storage configuration by causing one or more host devices that access the set of storage arrays to synchronously halt input-output operations associated with the set of storage arrays;
wherein managing generation of the backup copy is configured to:
receive notification from the one or more host devices that input-output operations associated with the set of storage arrays have been halted; and
instruct the one or more host devices to initiate a backup copy operation once the notification is received from the one or more host devices to cause the backup copy to be created in each of the set of storage arrays.

2. The apparatus of claim 1, wherein managing generation of a backup copy at each of a set of storage arrays in an active-active storage configuration further comprises querying each of the set of storage arrays to discover the one or more host devices that access the set of storage arrays.

3. The apparatus of claim 2, wherein managing generation of a backup copy at each of a set of storage arrays in an active-active storage configuration further comprises instructing each of the discovered one or more host devices to synchronously halt input-output operations associated with the set of storage arrays.

4. The apparatus of claim 3, wherein managing generation of a backup copy at each of a set of storage arrays in an active-active storage configuration further comprises receiving a request from each of the discovered one or more host devices to create a backup copy on each of the set of storage arrays.

5. The apparatus of claim 4, wherein managing generation of a backup copy at each of a set of storage arrays in an active-active storage configuration further comprises instructing each of the set of storage arrays to create a backup copy.

6. The apparatus of claim 5, wherein managing generation of a backup copy at each of a set of storage arrays in an active-active storage configuration further comprises receiving notification from each of the set of storage arrays that a backup copy has been created.

7. The apparatus of claim 6, wherein managing generation of a backup copy at each of a set of storage arrays in an active-active storage configuration further comprises notifying each of the discovered one or more host devices that a backup copy has been created on each of the set of storage arrays and to release the halt on the input-output operations.

8. The apparatus of claim 1, wherein the processing device, when executing program code, is further configured to cause a restore operation on each of the set of storage arrays using a respective backup copy created for each of the set of storage arrays.

9. The apparatus of claim 8, wherein the processing device, when executing program code, is further configured to cause a verification that the data restored on each of the set of storage arrays is identical on each of the set of storage arrays.

10. A method comprising:
managing generation of a backup copy of data in each of a set of storage arrays in an active-active storage configuration by causing one or more host devices that access the set of storage arrays to synchronously halt input-output operations associated with the set of storage arrays;
wherein managing generation of the backup copy further comprises:
receiving notification from the one or more host devices that input-output operations associated with the set of storage arrays have been halted; and
instructing the one or more host devices to initiate a backup copy operation once the notification is received from the one or more host devices to cause the backup copy to be created in each of the set of storage arrays;
wherein the steps are performed by at least one processing device comprising a processor coupled to a memory executing program code.

11. The method of claim 10, wherein managing generation of a backup copy at each of a set of storage arrays in an active-active storage configuration further comprises:
querying each of the set of storage arrays to discover the one or more host devices that access the set of storage arrays; and
instructing each of the discovered one or more host devices to synchronously halt input-output operations associated with the set of storage arrays.

12. The method of claim 11, wherein managing generation of a backup copy at each of a set of storage arrays in an active-active storage configuration further comprises receiving a request from each of the discovered one or more host devices to create a backup copy on each of the set of storage arrays.

13. The method of claim 12, wherein managing generation of a backup copy at each of a set of storage arrays in an active-active storage configuration further comprises instructing each of the set of storage arrays to create a backup copy.

14. The method of claim 10, further comprising receiving notification from each of the set of storage arrays that a backup copy has been created.

15. The method of claim 14, further comprising notifying each of the discovered one or more host devices that a backup copy has been created on each of the set of storage arrays and to release the halt on the input-output operations.

16. A computer program product comprising a non-transitory processor-readable storage medium having stored therein program code of one or more software programs, wherein the program code when executed by at least one processing device causes the at least one processing device to:
manage generation of a backup copy of data in each of a set of storage arrays in an active-active storage configuration by causing one or more host devices that access the set of storage arrays to synchronously halt input-output operations associated with the set of storage arrays prior to causing the backup copy to be created in each of the set of storage arrays;
cause a restore operation on each of the set of storage arrays using the respective backup copy created for each of the set of storage arrays; and
cause a verification that the data restored on each of the set of storage arrays is identical on each of the set of storage arrays.

17. An apparatus comprising:
at least one processing device comprising a processor coupled to a memory, the at least one processing device, when executing program code, is configured to:
manage generation of a backup copy of data in each of a set of storage arrays in an active-active storage configuration by causing one or more host devices that access the set of storage arrays to synchronously halt input-output operations associated with the set of storage arrays prior to causing the backup copy to be created in each of the set of storage arrays;
cause a restore operation on each of the set of storage arrays using a respective backup copy created for each of the set of storage arrays; and
cause a verification that the data restored on each of the set of storage arrays is identical on each of the set of storage arrays.

* * * * *